United States Patent [19]
Nakata

[11] 3,869,217
[45] Mar. 4, 1975

[54] BALL JOINT

[76] Inventor: Katsuhide Nakata, 200 Plastspuma Ave., Sao Paulo, Brazil

[22] Filed: June 6, 1973

[21] Appl. No.: 367,421

[30] Foreign Application Priority Data
June 19, 1972 Brazil .................................... 3952

[52] U.S. Cl. ............................................. 403/140
[51] Int. Cl. ............................................. F16c 11/06
[58] Field of Search ...................... 403/76, 122–140

[56] References Cited
UNITED STATES PATENTS

| | | | |
|---|---|---|---|
| 3,233,929 | 2/1966 | Herbenan | 403/140 |
| 3,253,845 | 5/1966 | Davies | 403/122 |
| 3,560,035 | 2/1971 | Kindel | 287/90 |
| 3,578,366 | 5/1971 | Snider | 403/140 |
| 3,677,587 | 7/1972 | Muller et al. | 403/140 |
| 3,722,931 | 3/1973 | Uchida | 403/140 |

FOREIGN PATENTS OR APPLICATIONS
1,194,623  11/1959  France ............................... 403/140

Primary Examiner—Geo. V. Larkin
Attorney, Agent, or Firm—Michael S. Striker

[57] ABSTRACT

A ball joint has a rigid socket, a wall of which is provided with an opening. A pin has a first portion extending through the opening and a ball-shaped second portion which is located with clearance in the socket. A cupped insert of resiliently yieldable material surrounds the second portion and fills the clearance. An inner circumferential surface of the insert is only in part in contact with the second portion and is in part spaced from the same so as to define therewith a pocket for accommodation of lubricating material. The insert is retained in the rigid socket by means of a circular plate spring.

6 Claims, 4 Drawing Figures

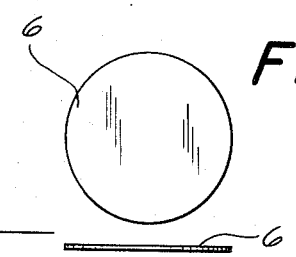
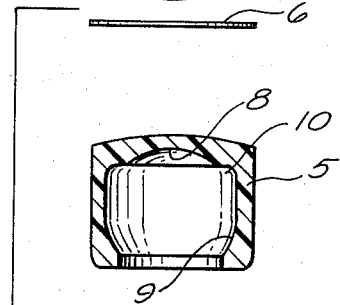
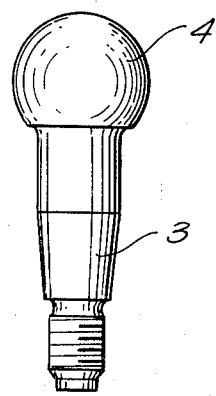
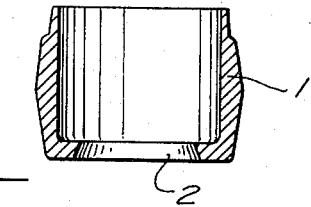
FIG. 4
FIG. 2
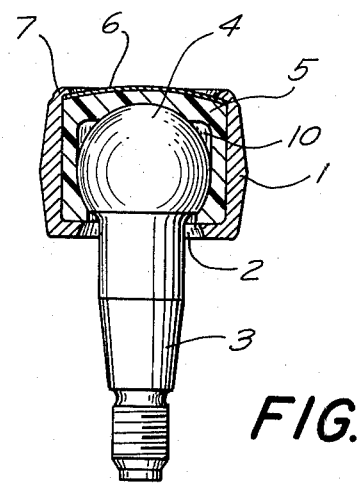
FIG. 1
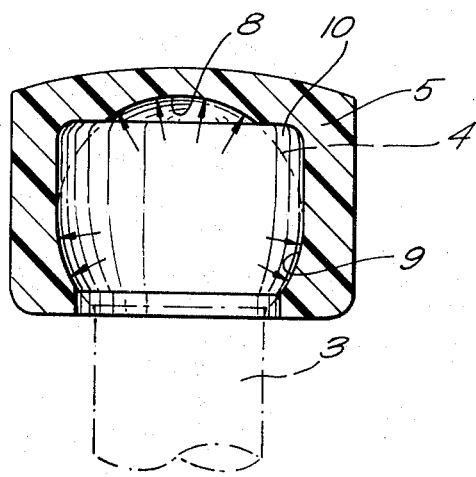
FIG. 3

BALL JOINT

BACKGROUND OF THE INVENTION

The present invention relates to a joint in general, and more particularly to a ball joint.

Ball joints, also known as ball-and-socket joints, are too well known in the art to require a detailed discussion of their general construction and purposes. By the nature of the configuration of their members they are relatively expensive and difficult to produce, in terms of the labor required and the machining which must be carried out on the various component parts. Also, they are not free of problems, as concerns wear or deformation, and therefore have a relatively short lifetime in certain types of applications.

SUMMARY OF THE INVENTION

It is a general object of the present invention to overcome the disadvantages of the prior art. More particularly, it is an object of the invention to provide an improved ball joint or ball-and-socket joint, which avoids the aforementioned disadvantages.

An additional object of the invention is to provide such an improved ball joint which can be manufactured at considerably reduced cost as compared to the prior-art constructions while, at the same time, providing a durability and effficiency which is at least equal to that of the prior art.

In keeping with these objects, and others which will become apparent hereafter, one feature of the invention resides in a ball joint which, briefly stated, comprises a rigid socket having a wall provided with an opening, and a pin having a first portion which extends through the opening and a ball-shaped second portion which is located with clearance in the socket. A cupped insert of resiliently yieldable material surrounds the second portion and fills the clearance. The insert has an inner circumferential surface which is partially in contact with the second portion and partially spaced from the same so as to define therewith a pocket for accommodation of lubricating material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial section through a ball joint according to the present invention, with parts being shown in elevation;

FIG. 2 illustrates the component parts of the ball joint of FIG. 1 in an exploded view;

FIG. 3 is a fragmentary axial section analogous to that of FIG. 1, but illustrating by means of the associated arrows the points of contact between the ball-shaped portion and the cupped insert; and FIG. 4 is a plan view of the circular plate spring in the illustrated embodiment.

DESCRIPTION OF THE PREFERRED EMBODIMENTS

Discussing the drawing in detail, and pointing out that the embodiment illustrated in FIGS. 1–4 is to be considered exemplary only, it will be seen that reference numeral 1 identifies a rigid socket which may in conventional manner be of metallic material. The socket 1 has a wall provided with an opening 2; opposite this wall the socket has an open side bounded by a circumferentially extending inwardly projecting flange 7.

A pin is provided having a first portion 3 the free end of which is threaded in the illustrated embodiment and which extends through the opening 2. The pin also has a spherical or ball-shaped second portion 4 which is located within the confines of the socket 1, being received therein with a substantial clearance as shown.

Also located in the socket 1, and dimensioned so as to fill the clearance between the inner surface of the socket 1 and the outer surface of the portion 4, is a cupped insert 5 of resiliently yieldable material, for instance nylon, polyethylene, polypropylene or the like. It will be seen that the insert 5 has an aperture which faces the opening 2 and through which the portion 3 also extends. In addition, the insert 5 has opposite the aforementioned aperture a transverse wall which faces and is located adjacent the open side of the socket 1, as is particularly clearly shown in FIG. 1. The insert 5 is retained in the socket 1 by a circular plate spring 6 which, as FIG. 4 shows more clearly, is of circular outline in the illustrated embodiment. A circumferential margin of the spring 6 is lodged between the transverse wall of the insert 5 and the flange 7, so that the spring is retained in position overlying the transverse wall of the insert 5, and in turn retains the insert 5 within the socket 1.

The assembly of the novel ball joint can be carried out in the manner suggested in FIG. 2, namely the portion 3 of the pin can be first inserted through the open side of the socket 1 and thereupon through the opening 2 thereof. Before the portion 4 of the pin enters the socket 1 it is advantageous to snap the insert 5 over it so that the insert 5 enters the socket 1 through the open side thereof with the portion 4. Subsequently the spring 6 is inserted, by deforming it appropriately so that it can enter the open side whereupon its margin is allowed to extend under the flange 7 to be retained thereby. However, FIG. 2 shows a further possibility with respect to the installation of the spring 6, namely for the socket 1 initially not to have the flange 7, so that no deformation of the spring 6 is necessary when the latter is inserted. After the insertion is completed the edge of the socket 1 which bounds the open side thereof is then upset to form the flange 7.

FIGS. 1 and 3 show particularly clearly the interior configuration of the insert 5. It will be seen that the surface bounding the interior is recessed at 8 so as to accommodate a part of the portion 4, as suggested in FIG. 3 where the portion 4 is shown in chain lines. This recessing at 8 is of course remote from the aperture and the opening 2. Closer to the aperture and the opening 2 a portion 9 of the innercircumferential surface also engages the surface of the portion 4. The transmission of force is indicated by the arrows in FIG. 3. The remainder of the inner circumferential surface of the insert 5 does not contact the outer surface of the pin portion 4, so that there is formed a pocket 10 (here of annular configuration) which is packed with an appropriate lubricant, such as lubricating grease, at the time the ball joint is assembled.

It will be appreciated that with this construction the circular plate spring 6 has a dual function. On the one hand it serves as a retainer for the insert 5. On the other hand, however, it acts as a buffer and will automatically and at all times maintain contact between the inner circumferential surface of the insert 5 and the outer circumferential surface of the pin portion 4, as indicated by the arrows in FIG. 3. These are the areas where the greatest stresses develop in the operation of the ball joint, and the provision of the spring 6 assures that there will be an automatic compensation for wear or deformation which may occur, whereas the presence of the lubricant-filled pocket 10 assures that during each movement of the joint there will be an automatic lubrication of the contacting surfaces. Moreover, vibrations which are normally experienced in prior-art ball joints are largely suppressed with this construction and the overall result of the novel construction is a substantially increased lifetime.

The pin can be easily, rapidly and uniformly mounted in the socket 1 during assembly, and it is preferable that the inner surface of the socket 1 and the outer surface of the insert 5 be slightly tapered in mating relationship to facilitate the assembly still further.

The novel ball joint according to the present invention provides, by comparison to the prior-art ones, a considerable reduction in the cost of manufacturing, because labor and labor expenses can be saved, as well as operating steps such as complicated machining which is time consuming and expensive. Moreover, the ball joint can be permanently prelubricated by providing lubricant in the pocket 10, and its lifetime will be greatly extended. The novel ball joint can be used wherever ball joints are employed, in conjunction with wheel pivots, steering arrangements and the like.

It will be understood that each of the elements described above, or two or more together, may also find a useful application in other types of constructions differing from the types described above.

While the invention has been illustrated and described as embodied in a ball joint, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A ball joint, comprising a rigid socket having an end wall provided with an opening, and an open side located opposite said wall and bounded by a marginal portion; a pin having a first portion extending through said opening, and a ball-shaped second portion located with clearance in said socket; a cupped insert of resiliently yieldable material surrounding said second portion and filling said clearance, said insert having an aperture facing said opening of said socket, and a transverse wall spaced from said aperture and facing said open side, said insert having an inner circumferential surface partially in contact with said second portion and partially spaced from the same so as to define a pocket for accommodation of lubricating material; and a circular spring plate extending across said open side in retaining engagement with said marginal portion and in biased contact with said transverse wall of said insert so as to receive and transmit pressures from and to the insert in an equal and balanced manner.

2. A ball joint as defined in claim 1, wherein said inner circumferential surface of said insert engages said second portion in regions which respectively are remote from and closer to said opening, and does not engage said second portion intermediate said regions to thereby define said pocket with said second portion.

3. A ball joint as defined in claim 2, wherein said pocket is annular.

4. A ball joint as defined in claim 1, wherein said first portion is threaded.

5. A ball joint as defined in claim 1, wherein said marginal portion is a circumferentially extending flange projecting inwardly of said open side, and wherein a circumferential margin of said circular plate spring is lodged between said flange and said transverse wall.

6. A ball joint as defined in claim 1, wherein said insert is of a material selected from the group composed of nylon, polyethylene and polypropylene.

* * * * *